United States Patent [19]

Graf

[11] 4,138,686
[45] Feb. 6, 1979

[54] ELECTROSTATIC NEUTRAL INK PRINTER

[76] Inventor: Ronald E. Graf, 9401 Union Pl., Gaithersburg, Md. 20760

[21] Appl. No.: 785,083

[22] Filed: Apr. 6, 1977

[51] Int. Cl.² .......................................... G01D 15/18
[52] U.S. Cl. ..................................................... 346/75
[58] Field of Search ......................................... 346/75

[56] References Cited

U.S. PATENT DOCUMENTS

| | | | |
|---|---|---|---|
| 3,769,624 | 10/1973 | Lee et al. | 346/75 X |
| 3,893,623 | 7/1975 | Toupin | 346/75 X |
| 4,023,183 | 5/1977 | Takano et al. | 346/75 |

*Primary Examiner*—George H. Miller, Jr.

[57] ABSTRACT

An electronically-controlled ink stream printer is disclosed which selects the ink used to produce an image by the controllable presence or absence of electrostatic forces acting mainly between portions of ink surface and portions of a solid surface. If the ink is electrically conducting then parts of the ink surface act as capacitor plates with parts of the solid surface forming complimentary plates. If the ink is a dielectric then parts of the ink surface develop a charge proportional to that induced on the contiguous solid surface. Various portions of the solid surface can have voltages applied independently.

The solid surfaces may resemble rotating drums, flat surfaces, or curved surfaces. Droplet paths are affected by an interplay between controllable electrical forces and uncontrollable but predictable forces such as inertia, adhesion, air pressure, surface pressure, and aerodynamics. The path of a droplet determines whether it will become part of an output image. Various embodiments are described using one drum, two drums, a stationary surface, and a drum and a stationary surface.

Also described are a means to prevent ink solids from precipitating and clogging any ink printer and a means to deflect the impact points of streams of selected droplets by discrete distances perpendicular to motion of the output means. This deflection of impact points can simulate a closer spacing between multiple ink jets.

34 Claims, 12 Drawing Figures

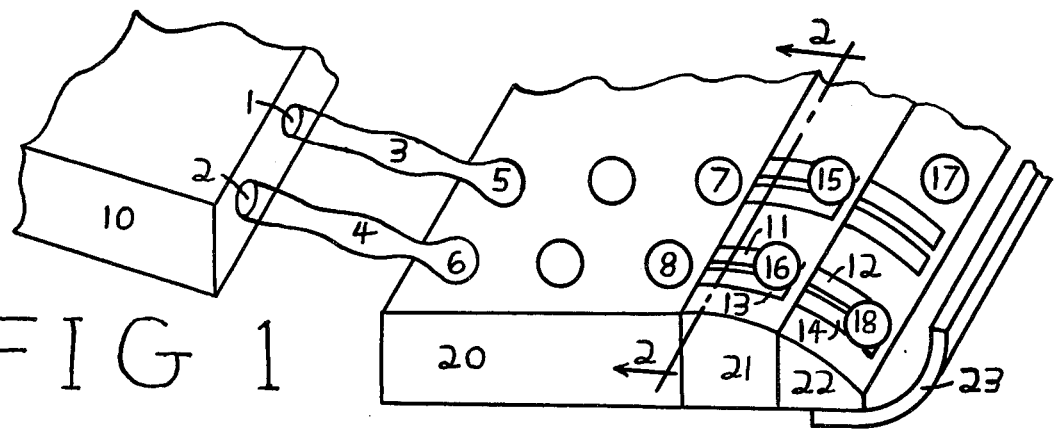
FIG 1
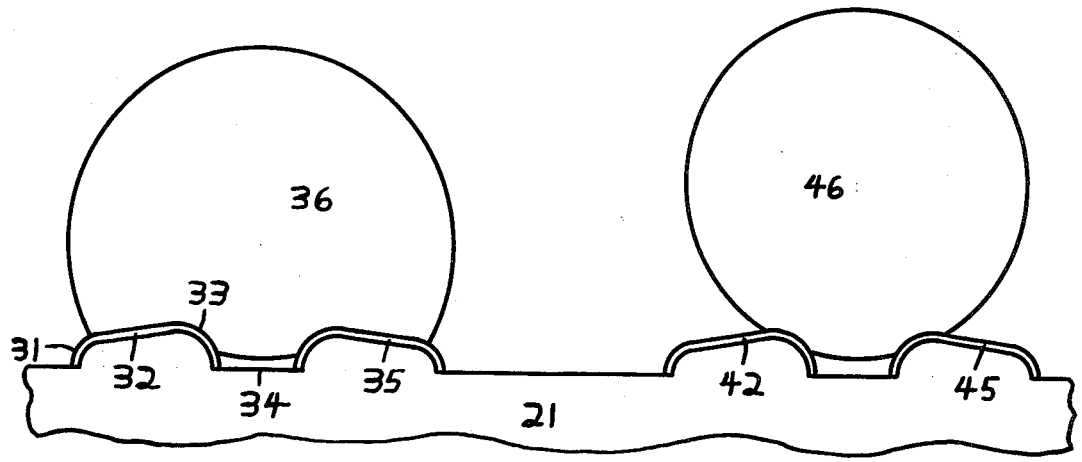
FIG 2
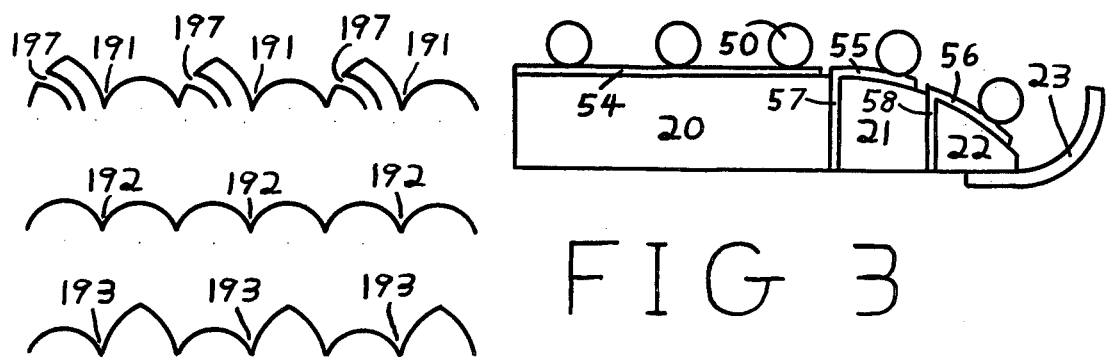
FIG 3
FIG 12

ELECTROSTATIC NEUTRAL INK PRINTER

BACKGROUND OF THE INVENTION

Recently, due to vast increases in computer speed and communication transmission rates, the need for rapid printing and ink image forming devices has increased. To meet the need, ink drop printers have been designed with one or a group of ink guns. Typically, in present systems, ink leaves the guns at cyclically varying velocities to form droplets from a stream of ink. The ink droplets are given an electric charge at their point of formation by electric fields at that point. Then each droplet is guided by other electric fields to strike paper at a predetermined point or to not strike the paper at all. The need to produce an electric field at the point of formation for each droplet stream dictates a minimum spacing between streams. Also, the ink must be electrically conducting and not by ionic conduction, unless some means is provided to remove an excess of ions of one type produced by electrifying the droplets. If the ink is ionic then a deadly gas or liquid might evolve at either the ink source or the paper depending on what ionic salt is used.

It is therefore an object of this invention to provide a line of or range of ink printers which can be electronically-controlled and can safely use an ionically-conducting ink. It is a further object to provide an ink printer which has no need to charge droplets of ink, but which can control separate closely-spaced streams of ink electronically. It is a further object to provide separate stream controls which can be manufactured using batch techniques. It is a still further object to provide a line of printers varying in speed, sophistication, and cost. It is a still further object to provide generalized means, available for use not confined only to the printers otherwise covered in this invention, to prevent ink clogging due to precipitation and to simulate a closer spacing between ink jets. These and other objects of this invention will become apparent upon reading the remainder of this disclosure.

SHORT STATEMENT OF THE INVENTION

An electronically-controlled ink stream printer is disclosed which selects the ink used to produce an image by the controllable presence or absence of electrostatic forces acting mainly between portions of ink surface and portions of a solid surface. If the ink is conducting then parts of the ink's surface act as capacitor plates with parts of the solid surface forming complimentary plates. If the ink is dielectric then parts of the ink surface touching charged parts of the solid surface develop a charge proportional to that on the solid surface. The ink moves rapidly along a trajectory bringing it into contact with the surface of a first solid, which can have voltages applied controllably to portions thereof. In some versions of the present invention the ink will almost immediately leave the surface of the solid with a velocity, charged mainly in direction, the change being dependent on voltage applied at the contacted surface portion. The charge in velocity determines whether the ink will hit an output surface or will be diverted from the output.

However, in most versions contemplated the ink not held by electrostatic forces will leave the surface of the first solid in a decision region, either due to inertia when the surface is curved or rotating, or due to interaction with air pressure, or due to interaction with a second surface which may or may not be electrified, or due to a combination of these factors. The rest of the ink will be held on the surface of the first solid until past the decision region by electrostatic forces resulting from voltages applied to selected portions of the surface of the first solid, which electrostatic forces augment other forces which are uncontrolled such as adhesion and air pressure. Either the ink leaving the first surface in the decision region or the ink clinging to the first surface through the decision region or each separately may be used to produce an image on paper. Four major versions of the above described printer system are disclosed. The distinctive features of the versions may be combined in hybrid systems.

In the first version the first solid is shaped like a drum or a stack of phonograph records and it rotates. Ink is given a velocity and hits the surface with roughly the velocity of the surface at the point of contact. The surface can be controllably electrified in many small portions. The ink forms into droplets either due to irregularities on the surface or due to variable stream velocities at the point of issuance from an ink supplying manifold. The decision region starts roughly where ink contacts the drum surface.

In a second version the first surface is stationary and contains a number of separate portions to which controllable voltages can be applied, each such portion being substantially a conducting strip in the form of an arc, the planes containing an approximate center line of each arc being substantially parallel. The conducting strips may be side by side in one rank or may be grouped in successive side by side rankings, each successive ranking arcing further around. The strips may be shaped in cross-section perpendicular to the motion along the strips so as to stabilize the motion of ink along a number of neighboring strips. The motion of the ink may also be stabilized by earlier parts of the surface of the solid, to be compatible with the orientations and positions of the first rank of conducting strips. In the preferred embodiment of this version, the ink will be conducting, possibly by ionic conduction; and each drop of ink will straddle two oxide-coated conducting strips in the decision region, thus forming two capacitors in series, one at the contact of each of the two strips with the drop. The conducting strips may be wires anchored in a dielectric base or the strips may be put on the surface of a preshaped dielectric base by techniques known in thin film technology.

In a third version an additional surface of a solid is provided which may or may not also be contacted by all the ink in the decision region. The second surface may or may not be electrifiable as the first surface is. The first surface is not necessarily the first contacted by the ink. In the preferred embodiment of this version, two oppositely rotating electrifiable drums operate on droplets contacting both drums in the decision region. All droplets are pulled by electrostatic forces toward one or the other drum.

In a fourth version an additional and possibly primary force to affect ink motion is air pressure. The pressure may be produced by an air stream from outside the solid surface, or it may act through slits in the solid surface. If acting through slits, the pressure may tend to remove ink from the surface or to pull ink toward the surface, in the case of sub-atmospheric pressure. Hybrid systems having combinations of the distinctive features of the various versions will be covered in the detailed description of the invention.

A general feature applicable to all liquid ink printers is also disclosed as follows. It is possible to add a means which will prevent precipitation of ink solids on surfaces of a printer which are exposed to both ink and air. One such means would send a stream of air saturated with ink base over all surfaces of the printer which are exposed to both ink and air. This means would keep unsaturated air from reaching and drying the ink thereon, and thus fouling the printer.

Another general feature applicable to almost all liquid ink printers is disclosed. It is possible to add a deflecting means to spread, for given initial ink stream conditions, the target impact points on an output means perpendicular to the motion of the output means at the point of impact. A rotary means causing air currents and moving with the same velocity as the ink at some point near the ink path could be used. Alternately, surface adhesion forces or magnetic forces could be used to produce variable deflections. Also, the droplets of ink can be bounced from the surface of a rotating means.

BRIEF DESCRIPTION OF THE DRAWINGS

Other features, objects, and advantages of the present invention will become apparent upon examination of the following detailed description, appended claims, and the accompanying drawings in which:

FIG. 1 is a perspective view of an ink jet manifold projecting ink onto a selector which allows some ink droplets to proceed to an output (not shown) and captures other droplets in a trough 23.

FIG. 2 shows two ink droplets each resting on a pair of conducting strips, the first droplet being pulled to its pair of strips by electrostatic forces.

FIG. 3 shows a side view of the selector of FIG. 1.

FIG. 12 shows three successive cuts of a selector drum or of a deflector drum illustrating two methods of deflecting ink droplets by successive incremental amounts perpendicular to motion of the output means, the cuts being made by planes containing the drum rotation axis.

DETAILED DESCRIPTION OF THE INVENTION

Figure 4:
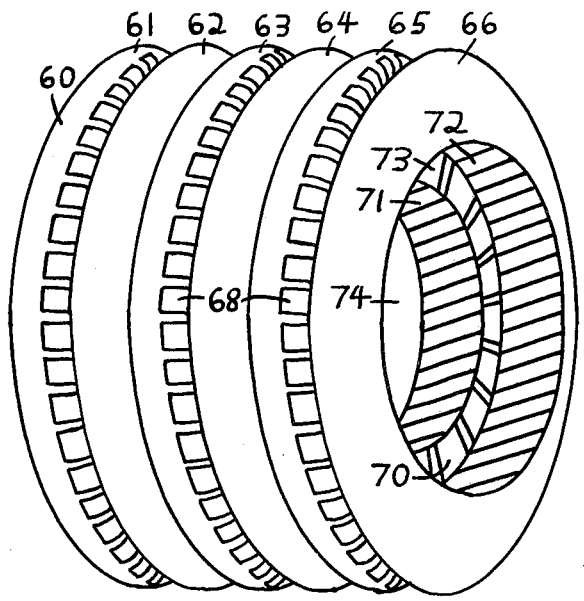
FIG. 4 is a perspective view of a selector drum composed of a stack of conducting discs and dielectric discs with conducting strips.

Refer now to FIG. 1 wherein is disclosed a first embodiment of the present invention. Ink streams 3 and 4 issue from holes 1 and 2 in manifold 10, which causes the ink to exit with varying velocity. The device extends to the rear beyond the drawing but only two of many ink streams are shown. Globules 5 and 6, while still attached to streams 3 and 4, are about to break away from the stream and form droplets of ink, as for instance droplets 7 and 8 have already done. Slab 20 supplies a substantially flat base along part of which streams of droplets run. Solid 21 supports curved conducting strips 11, and 13, etc., while solid 22 supports a second set of curved strips typified by strips 12 and 14. Trough 23 collects any ink droplets which are pulled around by voltages applied to strips on base 21 and base 22, such as droplet 18. Droplet 17 and droplets 15 and 16 will not be caught in trough 23, but will continue to an output surface, not shown.

In operation streams of ink 3 and 4 and others issue from manifold 10 with variable velocity such that successive droplets are formed from each stream at a prescribed time interval apart. The formed droplets contact the face of slab 20 or the droplets form thereon and then travel along slab 20 until reaching the border of solid 21. At this point, if the droplet is not to be part of an image, then it is attracted to follow a pair of conducting strips with voltage applied between them, such as the pair 11 and 13 on solid 21. If the droplet is to be part of the image, then no voltage is applied to the conducting strips as the droplet passes over. This has been the case for droplets 15 and 16. In the case of these droplets, inertial forces overcame surface adhesion forces and the droplets flew in an almost straight line tending to leave the surface of solid 21. Voltages which were applied to strips on solid 21 during the passage of any droplet over the strips are next applied to the succeeding strips on solid 22 during the passage of the same droplet over the succeeding strips. Simultaneously new voltages are applied to the strips on solid 21. Thus, a new set of droplets, which cross the border between slab 20 and solid 21 at the same time that a previous set of droplets reaches the border between solid 21 and solid 22, can have a new set of commands, or voltages, while the previous set continues with the old command, or voltages. From another viewpoint, the interval of time between droplet formation is chosen to be the same as the travel time of droplets along solid 21 or solid 22 or any succeeding solids if more than two were in the design. The electronic signals must be synchronized, including a time lag, with ink stream velocity changes to coincide with the time of droplet arrival at the conducting strips. Droplets which are pulled by electrical forces along both sets of strips will be collected in trough 23 and recycled to the ink supply. Droplets which travel a straighter path, not as affected by electrical forces will hit an output means and form an image, possibly on a roll of paper. The output means, while not shown in FIG. 1 to conserve space, could be the paper 153 of FIG. 9 disposed in the same orientation.

Cut 2 indicated in FIG. 1 is shown in FIG. 2 together with two ink droplets 36 and 46. Droplet 36 is riding on strips 32 and 35 between which is a large applied voltage. Droplet 46 is riding on strips 42 and 45 with no applied voltage between the strips. Conducting strips 32 and 35 might correspond to strips 11 and 13 of FIG. 1, but they are looked at during an arbitrary time interval and should be thought of as any pair of strips. The conducting strips are shown as thin films formed on dielectric solid 21. They could equally well be wires mounted on a dielectric base. A cut of solid 22 might look identical to the cut of solid 21 except for thickness of the solid. The conducting strips are covered with a thin dielectric film, not shown, whenever conducting ink will be used. Rounded edges 31 and 33 are formed to prevent high electric fields at the edges of the conducting strips, especially between pairs. Notice the droplet 36 has been pulled into depression 34 and also has been spread across each strip away from the central depression. Thus, the effect of the voltage is not only to increase the adhesion between the droplet and the strips, but also to increase the area over which adhesion applies. Notice also that if a droplet moves slightly off center to the right or left there will be two restoring forces. First, there will be a small component of centrifugal force directed toward the center. Secondly, and more importantly, if the area of adhesion on one strip increases, indicating a move toward that strip, then adhesive force per unit area on that strip will decrease. Simultaneously, adhesive force will increase on the other strip from which the droplet has moved, thus pulling back the droplet. The unequal adhesive pressures occur because a neutral droplet will put roughly equal total electrical charge at the boundary with each strip. Droplet 46 is not being pulled onto strips 42 and 45 by any applied voltage. The area of adhesion is less than for droplet 36, and the droplet will tend to fly off the strips due to inertial forces.

FIG. 3 shows a side view of slab 20, solids 21 and 22, and trough 23 of FIG. 1. Conducting strip 55 in FIG. 3 represents strips 11 and 13 of FIG. 1 and others hidden behind them in this view. Similarly, strip 56 represents strips 12 and 14 and others hidden behind them. Guide 54 on slab 20 represents a guide for each ink droplet stream and may be a single raised strip for each stream centered to point between a pair of conducting strips on solid 21. If a droplet 50 strays off center, then the side of the droplet nearest the guide strip will experience frictional drag, causing the droplet to turn back toward the guide strip. Alternatively, two constantly electrified strips similar to those on solid 21 may be used as a guide. Conductors 57 and 58 each represent a group of conductors bringing voltages to the conducting strips represented by 55 and 56. Electronic logic is attached to the other ends of conductors 57 and 58.

FIGS. 4 through 9 show aspects of another version of the invention in a preferred embodiment for this version. It is similar to the first embodiment of the invention in that selected droplets of ink are caused to follow a curved path by electrostatic forces acting mainly at contacting surfaces between the ink and a solid surface. In this version the solid surface is moving rather than stationary, but inertia still provides a major force to lift the rest of the droplets from the moving surface.

FIG. 4 shows a series of dielectric washers 61, 63, and 65, and alternate electrically conducting washers 62, 64, and 66. The washers are stacked and bonded together to form a drum 60, which is a part of a unit capable of controlling three side by side ink streams. In actual applications more than three ink streams are contemplated. Surfaces 72 and 74 are the cylindrically-shaped inner surfaces of washers 66 and 64 respectively. Surface 71 is the cylindrical inner surface of dielectric washer 65 and protrudes inwardly from recessed surfaces 72 and 74. Face 73 on dielectric washer 65 is exposed and has ends 70 of metal strips exposed. The metal strips extend radially along one face of each dielectric washer. Tab 68 is the other end of a metal strip and will normally be coated with a dielectric layer, probably an oxide. The metal strips are shown in more detail in FIG. 6 which shows washer 65 removed from drum 60, and will be discussed shortly.

Figure 5:
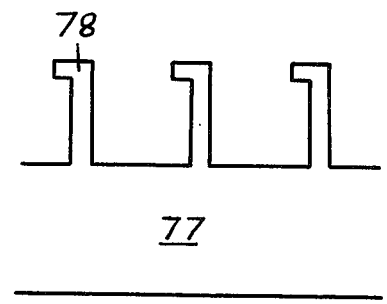
FIG. 5 is a side view of electrical brushes to be used in conjunction with the selector drum.

FIG. 5 shows a series of metal brushes 78 through which controlled voltages, depending on the desired image, will be transmitted to the metal strips. They are attached to a base 77 which when in place will hold the brushes against the appropriate faces. Alternatively, the logic which translates and amplifies image signals to specific applied voltages for the drum surface could reside on the rotating drum. There are many possibilities for transferring electrical power and image signals to the drum. Inductance, i.e. transformer, with both primary and secondary coils being wound about the rotation axis of the drum would be a possibility for transferring alternating current power. As a matter of fact, the motion of the drum could be used to generate electric power directly on the drum or on an extension thereof. Higher frequency image signals could be transmitted to a loop antenna whose axis is along the drum rotation axis.

Getting back to the embodiment shown in FIGS. 4 through 9, FIG. 6 shows the face of washer 65. On the face are a set of conducting strips, bare at ends 70 and coated with a layer of dielectric elsewhere. Metal films 79 form capacitors on the strips by adding metal over the dielectric which covers parts of the strips. These capacitors are tested, and leaky ones are coated with a thick dielectric cover to make leaky ones unconnectable to metal washer 66 of FIG. 4. As long as a minimum number of acceptable capacitors exists on each strip of a dielectric washer 65 it is suitable to become part of a drum. The ends 68 of the strips are seen on the surface of drum 60 in FIG. 4.

Figure 7:
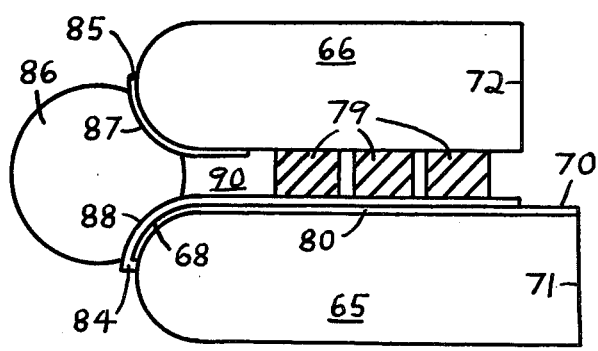
FIG. 7 is a slice made by a plane containing the rotation axis of the selector drum but showing only discs 65 and 66 with an ink droplet added on the surface.

FIG. 7 shows the details of what happens when a droplet of conducting ink is at a position touching the outer end 68 of a strip on dielectric washer 65 and also touching metal washer 66. Metal films 79 form capacitors between themselves and conducting strip 80, which is an extension of tab 70. Dielectric film 84 forms the dielectric of the capacitor. The metal films 79 are connected to metal washer 66 at their common boundaries. A potential can be impressed between conducting strip 80 and washer 66 by applying voltage between 72 and tab 70. The capacitors formed between metal films 79 and conducting strip 80 will hold this voltage if tab 70 becomes isolated, as is the case upon continued drum rotation in practice. If conducting droplet 86 assumes its indicated position while a voltage exists between conducting strip 80 and washer 66, then pairs of electrical charges will appear at interfaces 87 and 88 respectively, because of respective voltage differences between the droplet and washer 66 and between the droplet and conducting strip 80. The droplet has formed capacitors at the two interfaces. The plates of the capacitors are the droplet and washer 66 in the one case and the droplet and conducting strip 80 in the second case. The charges of these capacitor plates tend to pull them together thus binding the droplet to the solid surfaces, and causing the droplet to increase its area of contact, and to decrease its maximum distance from the drum. The electrostatic adhesive force per unit area is roughly proportional to the square of the voltage between conducting strip 80 and washer 66.

Figure 8:
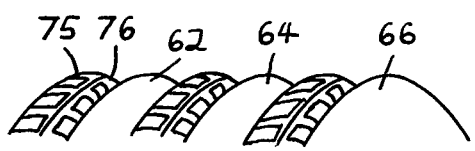
FIG. 8 is the top only of a modified selector drum capable of handling twice as many ink droplet streams, shown in the same perspective as FIG. 4.
Figure 6:
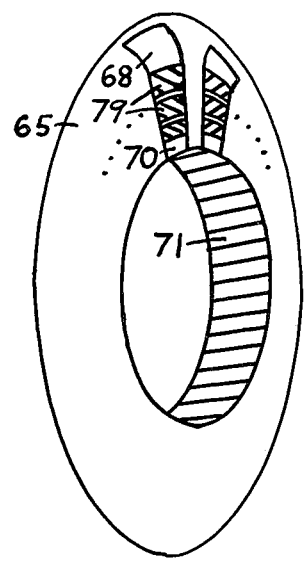
FIG. 6 shows disc 65 removed from the selector drum but in the same perspective.
Figure 9:
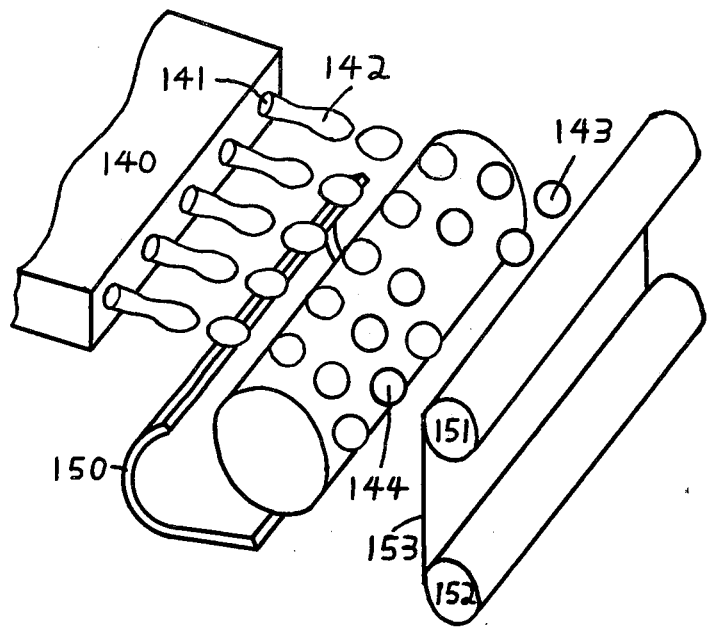
FIG. 9 is a perspective view of an ink manifold, a drum selector, and an output device showing their relationship.

FIG. 8 shows a refinement of the drum shown in FIG. 4, but only the top of the drum is shown in order to conserve space, since the rest of the figure would be an obvious extension of the drum shown in FIG. 4. Dielectric washers 75 and 76 of FIG. 8 are equivalent to an altered washer 61 of FIG. 4 if both faces are made to be like the face shown in FIG. 6 and if further the washer 61 were sliced in half perpendicular to its rotational axis of symmetry. The reason for making two washers each with one face rather than one washer with two faces is to decrease rejection rates in manufacture due to faulty faces. Metal washers 62, 64, and 66 are the same as before. The above refinement doubles the number of ink droplets which can be process in a given time by an ink printer such as shown in FIG. 9 using a drum such as 60 of FIG. 4. FIG. 8 was drawn as an analog of FIG. 4, but to allow dielectric washer 75 to operate, a metal washer similar to washer 66 must be placed to the left of it in the stack.

The operation of the printer will now be described using FIG. 9. Manifold 140 contains holes 141 from which ink streams 142 issue. Each stream breaks into droplets of ink either on the drum or before reaching the drum. Some droplets are strongly attracted to and carried around the drum, as for example droplet 144, by electrostatic forces the origin of which forces was mentioned in the description of FIG. 7. Other droplets, such as droplet 143, continue on an almost straight path whenever no voltage exists between the metal strip and the washer with which they come into contact. Surface adhesion is not sufficient to overcome inertial forces at a sufficiently high droplet speed and corresponding rotation rate for the drum. Droplet velocity should roughly equal the surface velocity of the drum at the point of contact. Those droplets which continue on an almost straight path hit a roll of paper 153 on rollers 151 and 152, which move the paper at a rate dependent on droplet frequency. If shading is desired in the output image then the droplet spots produced on the output paper may overlap so that more or less drops may be selected to hit a given area. In order to get better coverage of an output means successive droplet impact targets for a particular droplet stream may be spread perpendicular to the main motion of the output means as will be discussed later because of a wider applicability.

Droplets such as 144, which are carried around the drum by electrostatic surface acting forces, will be released into trough 150, by reducing voltage between the metal washer and the conducting strip touching the droplet. The voltage will be reduced at the appropriate point in the drum revolution, where the droplet velocity is pointing roughly at the center of trough 150. Ink will travel back to the ink supply from the trough.

In the first two versions of the invention for which embodiments have been shown, inertial forces play an important role in determining ink motion. In a third version, air pressure forces play a significant role. Suppose that the version shown in FIGS. 4 through 9 were modified to supply air under pressure to space 90 of FIG. 7. The contours of interface 87 and 88 might also be slightly modified to enhance the difference between pressure force on ink held electrostatically and on ink not held electrostatically. Further, positive pressure will augment inertial forces; whereas, negative pressure, i.e. partial vacuum, will oppose inertial forces and augment electrostatic forces. Thus, varying the pressure will allow increased or decreased drum operating speeds. Air pressure could also be used at a selected phase of revolution to cause all remaining droplets to leave the drum and go, for example, to the collector trough, or to another output image. Air pressure could be used acting from slits between cooperating strips in version one, FIGS. 1 through 3, as well as in version two and negative pressure in this case would again allow a speed up of droplets for a given curvature of the conducting strips. If the curvature of the surfaces of version one is removed thus removing the curvature of the conducting strips and air is expelled from the slits between cooperating pairs of conducting strips, then droplets forced off the surface by air can be caught in a trough or a vacuum system and droplets remaining on the surface to the end can form an image.

An added advantage of using air pressure and attendant air streams is that the air can be saturated with vapor of the ink base so that ink will never dry while on the printer surfaces associated with electrostatic control. Of course, air saturated with vapor could be directed at various parts of the printer whether or not the air is used to affect motion of the droplets. For instance, saturated air can be directed into a groove containing all the holes of the ink stream manifold. The technique of using saturated vapor could be applied generally in any system in which air drying would be a problem. Other types of ink drop printers using charged ink drops also could use the saturated air techniques at the source of the ink streams.

Figure 10:
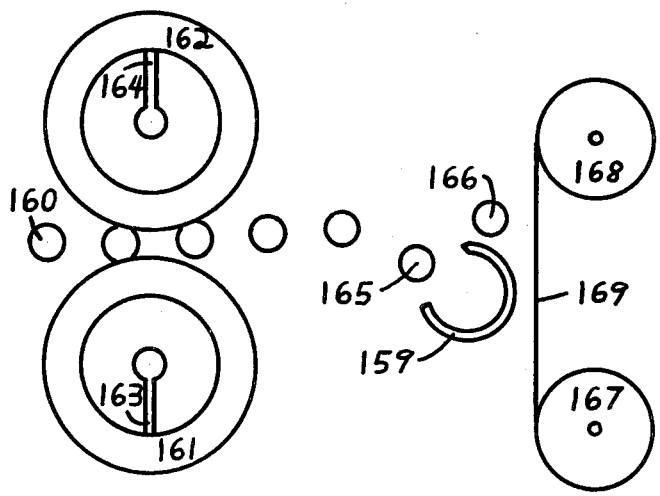
FIG. 10 is a side view of ink droplet streams, a two drum selector, a capture trough, and an image output means.

FIG. 10 shows a fourth version of the present invention. Drums 161 and 162 are each composed of metal washers coated with a thin film of dielectric near the outer edge and spaced by dielectric material. Each rotates so that its circumference has nearly the same velocity as the stream of droplets 160 at points where the droplets contact the drums. Pairs of neighboring washers act together to attract an ink droplet toward their drum whenever sufficient voltage is imposed between them. If a pair on one drum is given a high voltage difference, then the opposing pair located opposite the first pair but on the other drum will not have a voltage difference applied to it. Voltages are applied to the washers through sets of brushes 163 and 164. Droplet 166 has been attracted toward drum 162 and is flying toward image output ink receiver 169, which rides on rollers 167 and 168. Droplet 165 has been attracted toward drum 161 and is flying toward trough 159, from which it will return to the ink supply. The significant feature of this version is that two surfaces are involved, one pulling the ink toward producing the primary image and the other pulling the ink away from producing the primary image. The drums need not necessarily have the same radius. In the case of equal radii there is practically no decision region for droplets. They are merely deflected toward the image output or the return trough.

Figure 11:
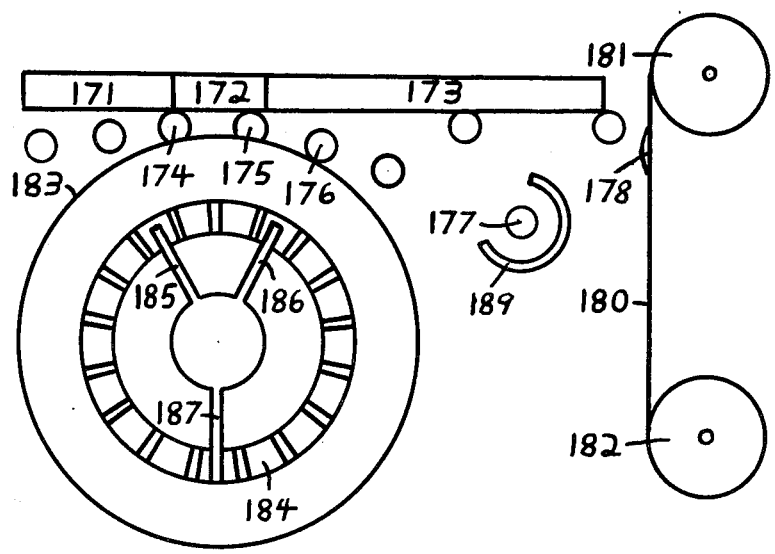
FIG. 11 is a side view of ink droplet streams, a selector composed of a drum, and a cooperating flat surface, a trough, and an image output means.

FIG. 11 shows another embodiment of the fourth version of the present invention. Drum 183 is similar to drum 60 of FIG. 4. Metal contacts 184 in FIG. 11 correspond to contacts 70 in FIG. 4. Brushes 185 activate selected portions of the drum surface with voltage to attract ink drops such as 175 and 176 to flatten onto the surface of the drum, thus avoiding or reducing contact with surface 172. Brushes 186 deactivate all portions of the drum surface by applying zero voltage as they pass the brushes. Droplet 176 is about to fly off the drum as droplet 177 has already done. Brushes 185 selectively do not activate some portions of drum surface and droplets contacting these portions, such as droplet 174, fly off the drum, and are attracted by dielectrically-coated conducting strips on surface 172. Corresponding conducting strips may exist on surface 173. Ink droplets fly off the end of surface 173 and hit the output surface 180 which is mounted on rollers 181 and 182.

In a modified version, using the same FIG. 11, the ink droplet stream would first contact surface 171. Controllable voltages on conducting strips on surface 172 would then determine whether a droplet would strongly contact drum 183 and thus lose contact with surfaces 172 and 173, or whether the droplet would maintain contact with strips on surface 172 and 173. In this modified version, drum 183 could have various levels of sophistication starting with a simple surface acting by adhesion and inertial forces to redirect ink drops to trough 189. The most practical version of drum 183 might be a drum such as drum 161 in FIG. 10, activated at all times to attract ink droplets and modified to blow off ink droplets at position 176 using air pressure or air stream pressure to aid inertial forces. The air could come from within the drum always escaping at the one orientation pointing roughly toward droplet 176.

Aspects of the various versions of this invention can be combined in other ways to form other embodiments of the invention. An insight applicable to almost all ink drop printers including those not covered by this invention concerns the spreading of impact points from a given stream perpendicular to motion of the output means (usually paper). It will first be discussed as applying to a printer using the drum of FIG. 4 and then generalized to printers not using a drum as a droplet selector.

The impact points of a particular droplet stream may be spread perpendicular to the main paper motion by perturbing the motion of either the droplet streams or the paper. The surface of the drum of FIG. 4, for instance, will interact with droplets perturbing their motion through surface adhesion, surface pressure, and air stream effects all of which are predictable. Additional forced streams of air may be added. A repetitive pattern could be set up on the drum to deflect each droplet of a number of groups of droplets of any particular stream, say six consecutive droplets, by uniform increments, so that the sixth member of each group would be deflected six times as far as the first member of each group. Of course, other equivalent arrangements may be conceived of, for instance one in which the middle member of a group is not deflected and other members are deflected to either or both sides. The groups would repeat, however many conducting strips there are around a drum washer divided by the number of droplets there are in a group. Air holes from which forced air issues could be added to the drum surface and the forced air could be pointed almost along the rotation axis of the drum and at the small angle up from the surface, so as to effect motion of a droplet mainly as it leaves the surface. See the explanation of FIG. 12 immediately following. Each droplet, moving as it does at roughly the speed of the drum surface would linger in the vicinity of and be affected by air streaming fron one and only one of the air holes in the drum surface. The air holes would be located between operational droplet positions so as not to contact the droplets. Incrementally varying hole sizes would cause incrementally varying droplet deflections.

Instead of air streams surface adhesion could be used to vary incrementally the deflection of specific droplets of a given stream, by tilting in successive increments the pockets into which droplets of ink, in a particular stream, fly. The tilt would be a rotation around the circumferential velocity vector of the surface. The droplet would be pulled toward the side tilted upward, since this will be the last side adhered to before the droplet leaves the drum.

FIG. 12 illustrates what is meant by tilt. It shows three successive cuts of a drum surface each cut being made by a plane containing the drum rotation axis. The inside of the drum is below each cut. Notice that the valleys 191 are tilted to the right so that droplets flying into them in a direction into the page will be attracted to bend left upon leaving. The valleys 192 are not tilted so particles will leave them being drawn neither to the left nor to the right. The valleys 193 being tilted to the left will cause droplets to bend their flight to the right while leaving the surface.

Air holes 197 have also been indicated in FIG. 12 on the first cut to illustrate how incrementally differing air streams could be used as an alternative to incremental tilting of the valleys in successive droplet sites around the drum.

A series of side by side rotating deflectors, such as the one described using FIG. 12, can be used at some point in a droplet stream not necessarily the selection point. The drum of FIG. 4 is a selector of which droplets will become part of an image and in this case the drum can double as a deflector. In other systems such as the one shown in FIG. 1, a deflector drum might be interposed between the output means and the selector, composed of parts 20, 21, 22, and 23. In printers using charged droplets a deflector drum could be interposed or a varying magnetic field can be used.

While the present invention has been disclosed in connection with the preferred embodiments thereof, there are other obvious variances of the present invention which fall within the spirit and scope thereof as defined by the appended claims.

In order to make the claims easier to state, the concept of a geometrical surface at a small depth interior from and parallel to a portion of surface of a solid will be introduced. This concept facilitates accuracy of statement about voltages on a conducting strip or plate placed on the surface of a solid, as shown in FIGS. 1, 2, 4, 6, 7, and 8.

If the conducting strip or plate is coated with an oxide or other dielectric coating, as shown in FIG. 7, components 80 and 84, then the surface of the solid structure including the solid, the conductor, and the oxide coating is simply the outer surface of the oxide coating where it exists. If a conducting droplet is placed above the oxide coating and maintained at a voltage different from the conductor on the solid, then voltage at the surface of the oxide will nearly match that of the droplet not that of the conductor. But, the voltage of the conductor of the solid structure is what is controlled in a printer not necessarily the voltage of the surface of the solid structure.

The concept of an associated geometrical surface at some small depth interior from and parallel to a portion of surface will thus be introduced to describe where the conductor actually exists and thus where voltage is actually controlled. The portions of surface must also be mentioned because this is where the forces are actually applied to the droplets. Charges appearing on the contacting surfaces of droplets cause electrostatic forces to be applied to the droplets.

Even in the case where bare conductors are placed on the surface of a solid the voltage is the same everywhere in the conductor and thus, since the conductor has a finite thickness and also exists at some small depth interior to a portion of surface, the same terminology describes this case also.

What is claimed is:

1. An ink printer which comprises a structure which produces a number of ink streams, which streams eventually break into separate droplets of ink, the ink of said ink streams contacting a surface of a first solid, upon which the ink from said ink streams is in droplet form during some interval, which said printer causes a first set of selected ink droplets to each maintain motion on a trajectory on which the droplet continually touches said surface of said first solid until beyond a region in which the ink droplet would normally fly permanently off the surface of said first solid due to forces such as inertial forces and air pressure forces overcoming other forces such as adhesion and possibly air pressure forces, each said trajectory on which each selected droplet continually touches the surface of said first solid until beyond said region being maintained as a result of sufficient voltages being applied on geometrical surfaces at a small depth interior from and parallel to selected portions of the surface of said first solid, said motion on any such said trajectory being caused in part by the addition of sufficiently large electrostatic forces being caused by said sufficient voltages, said electrostatic forces acting almost exclusively at contacting surfaces of each selected ink droplet and of individual ones of said selected portions of the surface of said first solid, and which printer causes the remaining ink droplets selectively less affected by electrostatic fields to fly permanently off the surface of said first solid in said region in which the ink droplets would normally fly permanently off the surface due to forces such as inertial forces and air pressure forces overcoming other forces acting toward said first solid such as adhesion and possibly air pressure, said surface of said first solid containing a number of portions of the surface, each of said number of portions of the surface having an associated geometrical surface at some small depth interior to the portion and parallel to that portion, and each said associated geometrical surface being controllable to exist in any of at least two voltage states at any future instant, assuming that appropriate control signals are given during any interval shortly preceding and including that instant.

2. The ink printer of claim 1 wherein the said surface of said first solid is penetrated by holes.

3. The ink printer of claim 1 wherein the said first solid is a series of wires held together by a common base.

4. The ink printer of claim 1 wherein air pressure is used to lift ink from the surface of said first solid at some point beyond the said region in which the ink would normally permanently fly off.

5. The ink printer of claim 1 contains a means which protects ink contacting surfaces normally exposed to air from ink evaporation and accompanying solid precipitation onto said surfaces, by passing a stream of air substantially saturated with ink base substance, for example water, over said surfaces.

6. The ink printer of claim 1 wherein said surface of said first solid is stationary and flat except for minor undulations and has substantially parallel insulated conducting strips thereon, which strips may have separate controlled voltages impressed on them, and wherein air exit slits are located between certain pairs of conducting strips to remove ink not held electrostatically to the strips.

7. The ink printer of claim 1 wherein said sufficient voltages whenever being particularly applied to affect the trajectory of any particular droplet contain simultaneously at least one voltage higher than the average voltage of said particular droplet and at least one voltage lower than the average voltage of said particular droplet, said average being a volume average over the volume of the droplet.

8. The ink printer of claim 1 wherein the said surface of said first solid is in motion.

9. The ink printer of claim 8 wherein said surface of said first solid is substantially a circular cylinder when averaged over surface irregularities.

10. The ink printer of claim 8 wherein said first solid is composed of a series of washers put together like stacked phonograph records, with centers along a common straight line, and wherein at least some of the washers each have many separate areas which can be separately charged and discharged and retain electric charge during the intervals between charging and discharging.

11. The ink printer of claim 8 wherein air pressure is used to lift ink from said surface of said first solid when the ink is beyond said region in which the ink would normally permanently fly off the surface.

12. The ink printer of claim 8 wherein the velocity of the surface of said first solid is approximately equal to the velocity of the ink at the first point of contact between the two.

13. The ink printer of claim 12 wherein the ink hits the moving surface in the form of at least one stream at least some of which separates into droplets on the surface of the said first solid, because of non-uniform environment, for example irregularities in surface terrain and irregularities in surface voltage.

14. The ink printer of claim 1 wherein the said surface of said first solid is stationary and has at least one curved section resembling the curved surface of a pie-shaped wedge taken out of a circular cylinder, except for possible minor holes and undulations, which curved section can have separate voltages impressed barely beneath the surface thereof along selected curved conducting strips.

15. The ink printer of claim 14 wherein said curved conducting strips are located side by side and oriented so that the plane containing the center line of any selected curved strip is substantially perpendicular to the axis of said circular cylinder of which said curved section resembles a partial surface.

16. The ink printer of claim 14 wherein said curved conducting strips are arranged in at least two successive side by side groupings such that the plane containing the center line of any selected strip is substantially perpendicular to the axis of said circular cylinder, and so that each successive side by side grouping is further around on the curved surface.

17. The ink printer of claim 14 wherein any globule of ink while moving along said curved strips touches simultaneously the surfaces above more than one curved strip except at the ends of strips.

18. The ink printer of claim 14 wherein the said curved strips are shaped in their smallest cross-section to stabilize the path of any ink droplet traveling along a planned path in which the droplet continuously touches part of the surface above at least one particular strip, said planned path being in a plane parallel to the plane containing the center line of the strip above which it is continuously touching.

19. The ink printer of claim 18 wherein a number of ink streams at least partially formed into strings of droplets are projected toward the solid surface and each droplet is then stabilized in advance by surface irregularities to meet said curved strips with a stable position and velocity combination for possible further travel touching continuously the surfaces above one pair of electrifiable strips.

20. An ink printer which comprises a structure which produces a number of ink streams, which streams eventually break into separate ink droplets,
said ink printer further comprising a first and second ink guiding surface, said surfaces guiding ink during contact with the ink, said first and second surfaces being mutually exclusive, and
a transfer region being the only region under normal operation in which ink may selectively transfer between the surfaces,
said ink printer causing a first set of selected ink droplets to maintain motion touching said first ink guiding surface beyond said transfer region in which the selected ink droplets could have transferred between the firt ink guiding surface and said second ink guiding surface if they had been selected contrariwise to do so, such maintaining of motion touching said first surface being due to the actions of forces such as for example inertial forces, electrostatic forces, aerodynamic forces, surface adhesion forces, and others,
said printer causing the remainder of the ink droplets to maintain contact with the second ink guiding surface beyond said transfer region as a result of forces such as for example inertial, electrostatic, aerodynamic, surface adhesion, and others,
said printer having a number of selected portions of surface, said portions of surface being portions of at least one of said first ink guiding surface and said second ink guiding surface, each one of said portions of surface having an associated geometrical surface at some small depth interior to the portion, and each said geometrical surface being controllable to exist at any of at least two voltages at any instant during normal operation after warm up, by giving appropriate control signals during an interval shortly preceding and including that instant,
the determining over a period of time of voltages, one associated with each of said selected portions, in turn determining which ink will remain on the first surface and which ink will remain on the second surface beyond the transfer region, the voltage associated with any selected portion of surface acting through electrostatic forces, which in turn act predominantly at the contacting surface between the ink droplets and the selected portion of surface, whenever voltage differs between the associated geometrical surface and the contacting ink.

21. The ink printer of claim 20 wherein at least one of the ink guiding surfaces rotates continuously during operation.

22. The ink printer of claim 20 which contains a means which protects ink contacting surfaces normally exposed to air from ink evaporation and accompanying solid precipitation onto said ink contacting surfaces, by passing a stream of air substantially saturated with ink base substance, for example water, over said surfaces.

23. The ink printer of claim 20 wherein air pressure is used to lift ink from one of the ink guiding surfaces when the ink is beyond said transfer region.

24. The ink printer of claim 20 wherein said voltages of said geometrical surfaces each associated with one of said number selected portions of surface act in groups with respect to particular droplets at any given instant, a given group of voltages being applied at a given instant to affect which said ink guiding surface a particular droplet will contact after leaving said transfer region, said given group at any instant containing at least one voltage higher at the given instant than the average voltage of said particular droplet and at least one voltage lower at the given instant than the average of said particular droplet at the given instant, said average being a volume average over the volume of the droplet.

25. An ink printer which comprises a structure which produces a number of ink streams, which streams eventually break into separate droplets of ink, the ink of said ink streams contacting a surface of a first solid upon which the ink from said ink streams is in droplet form during some interval,
which said printer causes a first set of selected ink droplets to maintain motion touching continually the surface of the first solid, said motion touching continually the surface of said first solid being maintained for the selected droplets until beyond an air pressure interacting region, as a result of sufficient voltages being selectively applied on associated geometrical surfaces at a small depth interior from and parallel to selected portions of the surface of said first solid, said first set of selected ink droplets being forced to maintain contact with the surface by a combination of sufficiently large electrostatic forces and other forces, said electrostatic forces acting almost exclusively at contacting surfaces of said selected ink droplets and said selected portions of the surface of said first solid,
and which printer causes the remaining ink droplets to leave permanently the surface of said first solid in the air pressure interacting region, due to forces selectively unopposed by sufficient voltages and resulting electrostatic forces,
said surface of said first solid containing a number of portions of the surface, each one of said portions of surface having an associated geometrical surface as some small depth interior to the portion, and each said geometrical surface being controllable to exist in any of at least two voltage states at any instant, assuming that appropriate signals are given during an interval shortly preceding and including that instant.

26. The ink printer of claim 25 wherein the forces due to air in said air pressure interacting region tend to remove ink from the surface of said at least one solid.

27. The ink printer of claim 25 wherein the forces due to air in said air pressure interacting region tend to preserve contact between the ink and the surface of said at least one solid.

28. The ink printer of claim 25 which contains at least one means which protects ink contacting surfaces normally exposed to air from ink evaporation and accompanying solid precipitation onto said ink contacting surfaces, by passing a stream of air substantially saturated with ink base substance, for example water, over said surfaces.

29. The ink printer of claim 25 wherein said sufficient voltages whenever being particularly applied to affect the trajectory of any particular droplet contain simultaneously at least one voltage higher than the average voltage of said particular droplet and at least one voltage lower than the average voltage of said particular droplet, said average being a volume average over the volume of the droplet.

30. A printer which comprises a structure which produces a number of ink streams, which streams eventually break into separate droplets of ink, the ink of said ink streams contacting a surface of at least one solid, said surface of at least one solid containing a number of portions of the surface, each one of said number or portions of the surface having an associated geometrical surface at some small depth interior to and parallel to the portion, and each said associated geometrical surface being controllable to exist at any of at least two voltages at any instant during normal operation, assuming that appropriate control signals are given during an interval shortly preceding and including that instant, the voltages associated with said number of selected portions of said surface causing selectively altered motion of said droplets of ink through the action of electrostatic forces acting predominantly at contacting surfaces between the droplets of ink and the said number of portions of said surface and acting whenever voltage differs between a given droplet of ink and the associated geometrical surface of a contacting given portion belonging to said number of portions of said surface, said selectively altered motion causing a certain desired portion of the ink to form a pattern on an output surface, said pattern being determined by the pattern of controlled voltage states associated with said number of selected portions of the said surface of at least one solid over a period of time.

31. The printer of claim 30 wherein said voltages whenever being particularly applied to selectively alter motion of any particular droplet contain simultaneously at least one voltage higher than the average voltage of said particular droplet and at least one voltage lower than the average voltage of said particular droplet, said average being a volume average over the volume of the droplet.

32. The ink printer of claim 30 wherein all the ink leaves said surface of at least one solid substantially at the same boundary but with a spread of velocities.

33. The ink printer of claim 32 further having a number of features taken from the group containing conducting strips, a curved ink guiding surface, a flat ink guiding surface, a rotating ink guiding surface, more than one ink guiding surface, air pressure interacting with ink motion, and means to counteract ink solid precipitation.

34. A printer which comprises a structure which produces a number of ink streams, which streams eventually break into separate droplets of ink, some of said droplets being selected to form a pattern on a given output surface and the rest of said droplets never reaching the given output surface, each droplet contacting at least one surface of said printer at a location at which an electrostatic force acting predominantly at the contacting surface of the droplet can be selectively controllably applied to the droplet, the determination of whether or not a given droplet will ever reach said given output surface being made by the pattern of strong application versus not strong application of electrostatic forces which when applied act predominantly only at surfaces of contact between said given droplet and selected portions of surface of said printer, and wherein said electrostatic forces, acting predominantly only at surfaces of contact between selected droplets and selected portions of surface, are caused by voltages applied on associated geometrical surfaces located at some small depth interior from and parallel to said selected portions of surface, each voltage never acting alone but acting in a group whenever acting on a particular droplet, such that each group acting simultaneously on a particular droplet contains at least one voltage higher and at least one voltage lower than the average voltage of the particular droplet, said average being a volume average over the volume of the droplet.

* * * * *